United States Patent
Wiseman et al.

(10) Patent No.: US 9,787,628 B2
(45) Date of Patent: Oct. 10, 2017

(54) MOBILE AD HOC NETWORKING

(71) Applicant: Facebook, Inc., Menlo Park, CA (US)

(72) Inventors: Joshua Wiseman, San Francisco, CA (US); David Harry Garcia, Sunnyvale, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/681,519

(22) Filed: Apr. 8, 2015

(65) Prior Publication Data

US 2015/0215263 A1     Jul. 30, 2015

Related U.S. Application Data

(63) Continuation of application No. 13/316,336, filed on Dec. 9, 2011, now Pat. No. 9,037,653.

(51) Int. Cl.
   *G06F 15/16*     (2006.01)
   *H04L 12/58*     (2006.01)
   (Continued)

(52) U.S. Cl.
   CPC ............ *H04L 51/32* (2013.01); *G06F 9/4451* (2013.01); *H04L 51/04* (2013.01); *H04L 67/14* (2013.01);
   (Continued)

(58) Field of Classification Search
   CPC . H04L 9/08; H04L 51/00; H04L 67/04; H04L 67/06; H04L 67/1068; H04L 51/32; H04L 67/104; H04L 67/18
See application file for complete search history.

(56) References Cited

U.S. PATENT DOCUMENTS 7,194,273 B2    3/2007    Vaudreuil
7,539,175 B2 *   5/2009    White ................. H04L 12/5692
                                                                370/329
(Continued)

FOREIGN PATENT DOCUMENTS

CN            102056209 A     5/2011
EP              1641184 A1     3/2006
(Continued)

OTHER PUBLICATIONS

International Search Report and Written Opinion for International Application PCT/US2012/068161, Mar. 28, 2013.
(Continued)

*Primary Examiner* — Brendan Higa
(74) *Attorney, Agent, or Firm* — Baker Botts L.L.P.

(57) ABSTRACT

In one embodiment, a method comprising by one or more computing devices, transmitting, from a first mobile device, a first message that includes a first user identifier corresponding to a first user of the first mobile device, wherein the first user identifier corresponds to a user account of the first user in a social-networking system, receiving, at the first mobile device, one or more second messages that includes a second user identifier corresponding to a second mobile device within a direct radio connectivity of the first mobile device, wherein the second user identifier corresponds to a respective user account of a second user in the social-networking system, and storing, at the first mobile device, information received in the second message for access by one or more applications hosted on the first mobile device.

20 Claims, 5 Drawing Sheets

(51) Int. Cl.
  *H04W 4/02* (2009.01)
  *H04W 4/20* (2009.01)
  *H04L 29/08* (2006.01)
  *G06F 9/445* (2006.01)

(52) U.S. Cl.
  CPC ............ *H04L 67/18* (2013.01); *H04L 67/306* (2013.01); *H04W 4/02* (2013.01); *H04W 4/206* (2013.01)

(56) References Cited

U.S. PATENT DOCUMENTS

| | | | |
|---|---|---|---|
| 8,131,858 | B2 | 3/2012 | Agulnik et al. |
| 2004/0111601 | A1 | 6/2004 | Racz |
| 2005/0120084 | A1* | 6/2005 | Hu et al. ...................... 709/206 |
| 2005/0197846 | A1* | 9/2005 | Pezaris .............. G06Q 10/0637 705/319 |
| 2006/0085419 | A1* | 4/2006 | Rosen .............................. 707/9 |
| 2007/0161402 | A1 | 7/2007 | Ng et al. |
| 2007/0233736 | A1* | 10/2007 | Xiong et al. ............... 707/104.1 |
| 2007/0273583 | A1 | 11/2007 | Rosenberg |
| 2007/0282621 | A1* | 12/2007 | Altman et al. .................... 705/1 |
| 2008/0070593 | A1* | 3/2008 | Altman et al. ................ 455/457 |
| 2008/0233957 | A1* | 9/2008 | Akama ........... H04M 1/274516 455/435.1 |
| 2008/0242277 | A1* | 10/2008 | Chen et al. ................ 455/414.2 |
| 2008/0275321 | A1 | 11/2008 | Furman |
| 2009/0157814 | A1 | 6/2009 | Lee et al. |
| 2009/0181653 | A1* | 7/2009 | Alharayeri .............. H04W 4/02 455/414.1 |
| 2010/0015991 | A1* | 1/2010 | Evans et al. ................ 455/456.1 |
| 2010/0061294 | A1 | 3/2010 | Proctor, Jr. et al. |
| 2010/0227554 | A1 | 9/2010 | Jabara et al. |
| 2010/0269156 | A1 | 10/2010 | Hohlfeld et al. |
| 2011/0035503 | A1* | 2/2011 | Zaid .................... H04L 63/0407 709/228 |
| 2011/0207440 | A1* | 8/2011 | Ruuspakka et al. ........ 455/414.1 |
| 2011/0282972 | A1* | 11/2011 | Rosen .......................... 709/219 |
| 2011/0314482 | A1* | 12/2011 | Cupala .............. G06F 17/30899 719/328 |
| 2012/0236820 | A1 | 9/2012 | Park et al. |
| 2012/0281686 | A1* | 11/2012 | Pollari .................. G06Q 30/02 370/338 |
| 2012/0331090 | A1* | 12/2012 | Kimchi ............... H04L 67/1046 709/217 |
| 2013/0114481 | A1 | 5/2013 | Kim et al. |
| 2013/0122936 | A1* | 5/2013 | Hudson et al. ............. 455/456.3 |
| 2013/0275513 | A1* | 10/2013 | Borovyk et al. .............. 709/204 |

FOREIGN PATENT DOCUMENTS

| | | |
|---|---|---|
| JP | 2004185449 | 7/2004 |
| JP | 2008176406 | 7/2008 |
| JP | 2009141513 A | 6/2009 |
| JP | 2009163443 A | 7/2009 |
| JP | 2009169914 A | 7/2009 |
| JP | 2009211173 | 9/2009 |
| JP | 2009272951 A | 11/2009 |
| KR | 10-2010-0018415 A | 2/2010 |
| KR | 20100018415 A | 2/2010 |
| KR | 10-2010-066853 A | 6/2010 |
| WO | WO 0133429 A2 * | 5/2001 |
| WO | 2010-123683 A2 | 10/2010 |
| WO | 2012/145004 A1 | 10/2012 |

OTHER PUBLICATIONS

Communication from the European Patent Office, Supplementary European Search Report and Annex for International Application PCT/US2012/068161, Jun. 18, 2015.
Japanese Patent Office, Communication regarding Notification of Reasons for Rejection with English translation, Japanese Patent Application 2014-546059 received by foreign associate on Sep. 29, 2015.
European Patent Office, Communication Under Rule 71(3) EPC and Annex to EPO Form 2004, Communication pursuant to Rule 71(3) EPC, Application No. 12 855 477.1-1853 received from Foreign Associate on Jul. 5, 2016.
The State Intellectual Property Office of the People's Republic of China, Notification of the First Office Action and Search Report with English translation, Application No. 201280060762X, received from Foreign Associate on Sep. 20, 2016, 33 total pages.
Office Action and Examination Search Report, Canadian Intellectual Property Office, Canadian Patent Application No. 2,915,692, dated Feb. 6, 2017, received from Foreign Associate, Stikeman Elliott on Mar. 21, 2017, 5 total pages.
Office Action, Notification of Reasons for Rejection with English Translation, Japanese Patent Application No. 2016-033103 dated Feb. 7, 2017, received from Foreign Associate on Feb. 28, 2017, 7 total pages.
The State Intellectual Property Office of the People's Republic of China, Notification of the Second Office Action with English translation, Application No. 201280060762X, dated Mar. 13, 2017, received from Foreign Associate, Kangxin Partners, P.C. on Apr. 19, 2017, 35 total pages.
Australian Government, IP Australia, Examination Report No. 1 for Standard Patent Application, Application No. 2016208348, dated Jun. 29, 2017.

* cited by examiner

MOBILE AD HOC NETWORKING

PRIORITY

This application is a continuation under 35 U.S.C. §120 of U.S. patent application Ser. No. 13/316,336 filed Dec. 9, 2011 entitled "Mobile Ad Hoc Networking".

TECHNICAL FIELD

This disclosure generally relates to social-networking systems, and more specifically relates to mobile ad hoc networking and presentation layer functions that incorporate social network system elements.

BACKGROUND

A social network, in general, is a social structure made up of entities, such as individuals or organizations that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social-networking system, such as a social-networking website, enables its users to interact with it and with each other through the system.

The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, or instant messaging) to facilitate social interaction between users in the social-networking system. The social-networking system may also create and store user preferences.

The advent of social-networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, e-mail to multiple accounts, multiple instant messaging protocols, twitter messages, voice-over-IP (VoIP) calls, video chats, SMS and MMS messages, social-networking messages, voicemail, push-to-talk (PTT), and dedicated notification-based message clients such as the Blackberry Messenger and Kik Messenger.

Wireless communications used in carrier-grade networks usually consist of a cell-based infrastructure where all mobile device nodes must communicate directly with a network base station. Alternatively, mobile device nodes may utilize a mobile ad-hoc network for wireless communication, where any mobile device node can communication with any other node, either directly or through multiple hops. Current wireless developments seek to improve Quality of Service so that carrier-grade service may be attained in a heterogeneous wireless environment.

DESCRIPTION OF EXAMPLE EMBODIMENTS

Figure 1:
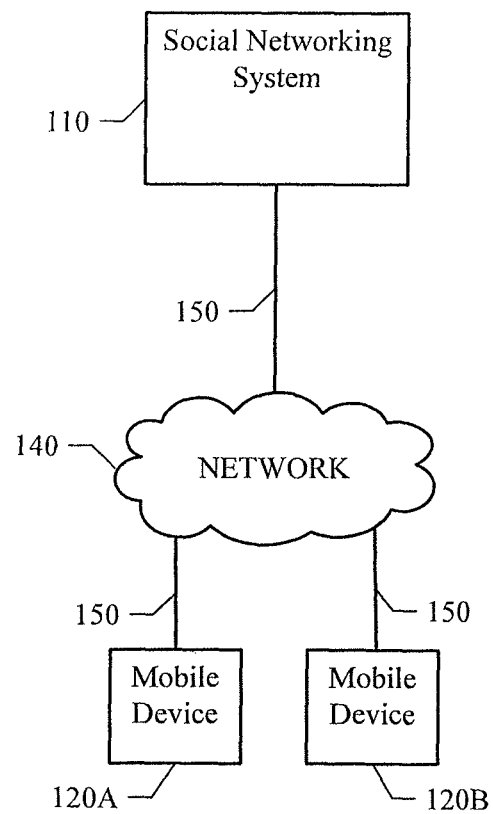
FIG. 1 illustrates an example system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social network, in general, is a social structure made up of entities, such as individuals or organizations that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social-networking system, such as a social-networking website, enables its users to interact with it and with each other through the system.

The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, or instant messaging) to facilitate social interaction between users in the social-networking system. The social-networking system may also create and store user preferences.

A social-networking system, such as a social-networking website, enables its users to interact with it, and with each other, through the system. Typically, to become a registered user of a social-networking system, an entity, either human or non-human, registers for an account with the social-networking system. Thereafter, the registered user may login to the social-networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social-networking system, the social-networking system may create and store a record, often referred to as a "user profile," in connection with the user. The user profile or account may be associated with a user identifier associated with the user. The user profile may include information provided by the user and information gathered by various systems, including the social-networking system, relating to activities or actions of the user. For example, the user may provide his name, profile picture, contact information, birth date, gender, marital status, family status, employment, education background, preferences, interests, and other demographical information to be included in his user profile. The user may identify other users of the social-networking system that the user considers to be his friends. A list of the user's friends or first degree contacts may be included in the user's profile. Connections in social-networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social-networking system allow the connection to be indirect via one or more levels of connections (e.g., friends of friends). Connections may be added explicitly by a user, for example, the user selecting a particular other user to be a friend, or automatically created by the social-networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social-networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social-networking system may support a variety of applications, such as photo sharing, on-line calendars and events. For example, the social-networking system may also include media sharing capabilities. Social-networking system may also allow users to configure events. For example, a first user may configure an event with attributes including time and date of the event, location of the event and other users invited to the event. The invited users may receive invitations to the event and respond (such as by accepting the invitation or declining it). Furthermore, social-networking system may allow users to maintain a personal calendar. Similarly to events, the calendar entries may include times, dates, locations and identities of other users.

The social-networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

The social-networking system may maintain a database of information relating to geographic locations or places. Places may correspond to various physical locations, such as restaurants, bars, train stations, airports and the like. In one implementation, each place can be maintained as a hub node in a social graph or other data structure maintained by the social-networking system, as described in U.S. patent application Ser. No. 12/763,171, which is incorporated by reference herein for all purposes. Social-networking system may allow users to access information regarding each place using a client application (e.g., a browser) hosted by a wired or wireless station, such as a laptop, desktop or mobile device. For example, social-networking system may serve web pages (or other structured documents) to users that request information about a place.

In addition to user profile and place information, the social-networking system may log or maintain other information about the user. For example, the social-networking system may support geo-social-networking system functionality including one or more location-based services that record the user's location. For example, users may access the geo-social-networking system using a special-purpose client application hosted by a mobile device of the user (or a web- or network-based application using a browser client). The client application may automatically access Global Positioning System (GPS) or other geo-location functions supported by the mobile device and report the user's current location to the geo-social-networking system.

In addition, the client application may support geo-social-networking functionality that allows users to check-in at various locations and communicate this location to other users. A check-in to a given place may occur when a user is physically located at a place and, using a mobile device, access the geo-social-networking system to register the user's presence at the place. A user may select a place from a list of existing places near to the user's current location or create a new place. The social-networking system may automatically check-in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social-networking system may select one or more records associated with check-in activities of users at a given place and include such check-in activity in web pages (or other structured documents) that correspond to a given place. The check-in activity may also be displayed on a user profile page and in news feeds provided to users of the social-networking system.

Still further, a special purpose client application hosted on a mobile device of a user may be configured to continuously capture location data of the mobile device and send the location data to social-networking system. In this manner, the social-networking system may log the user's location and provide various recommendations to the user related to places that are proximal to the user's path or that are frequented by the user. In one implementation, a user may opt in to this recommendation service, which causes the client application to periodically post location data of the user to the social-networking system.

A social-networking system may support a news feed service. A news feed is a data format typically used for providing users with frequently updated content. A social-networking system may provide various news feeds to its users, where each news feed includes content relating to a specific subject matter or topic. Various pieces of content relating to a particular topic may be aggregated into a single news feed. The topic may be broad such as various events associated with users within a threshold degree of separation of a subject user, and/or updates to pages that a user has liked or otherwise established a subscriber relationship. Individual users of the social-networking system may subscribe to specific news feeds of interest. U.S. Pat. No. 7,669,123, incorporated by reference in its entirety for all purposes, describes a system that can be used to dynamically provide a news feed in a social-networking system. A group of related actions may be presented together to a user of the social-networking system in the same news feed. For example, a news feed concerning an event organized through the social-networking system may include information about the event, such as its time, location, and attendees, and photos taken at the event, which have been uploaded to the social-networking system. U.S. application Ser. No. 12/884,010, incorporated by reference in its entirety for all purposes, describes a system that can be used to construct a news feed comprising related actions and present the news feed to a user of the social-networking system.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

FIG. 1 illustrates an example system whereby mobile devices 120A, 120B interact with the social-networking system 110 through a network 140. In particular embodiments, links 150 illustrate interactions between mobile devices 120A, 120B and social-networking system 110.

Mobile devices 120A, 120B are generally a computer or computing device including functionality for communicating over a computer network (e.g., remotely). Mobile devices 120A, 120B may be a laptop computer, personal digital assistant (PDA), in- or out-of-car navigation system, smartphone or other cellular or mobile phone, or mobile gaming device, among other suitable mobile computing devices. Mobile devices 120A, 120B may execute one or more client applications, such as a web browser (e.g., Microsoft Windows Internet Explorer, Mozilla Firefox, Apple Safari, Google Chrome, and Opera, etc.), to access and view content over a computer network.

In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, or another link 150 or a combination of two or more such links 150. The present disclosure contemplates any suitable links 150 coupling mobile device 120 and social-networking system 110 to network 140.

Social-networking system 110 may have a system front end, which may include web or HTTP server functionality, as well as other functionality, to allow users to access the social-networking system 110. Social-networking system 110 may have a location database to maintain an information base of places and a presence server operative to monitor online presence of users and to provide presence information to one or more requesting clients, such as mobile devices 120A, 120B. Network 140 generally represents a network or collection of networks (such as the Internet or a corporate intranet, or a combination of both, or an ad hoc network) over which mobile devices 120 may access the social network system 110.

Social-networking system 110 may have a location database that stores an information base of places, where each place includes a name, a geographic location and meta information (such as the user that initially created the place, reviews, comments, check-in activity data, one or more web pages associated with the place and corresponding links to the one or more web pages, and the like). Places may be created by administrators of the system and/or created by users of the system. For example, a user may register a new place by accessing a client application to define a place name and provide a geographic location and cause the newly created place to be registered in the location database.

In particular embodiments, the system front end may construct and serve a web page of a place, as requested by a user. In some embodiments, a web page of a place may include selectable components for a user to "like" the place or check in to the place. In particular embodiments, the location database may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning.

In particular embodiments, the location database may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place.

In particular embodiments, the location database may store a user's location data. For example, a user can create a place (e.g., a new restaurant or coffee shop) and the social networking system can store the created place in the location database. For example, the location database may store a user's check-in activities. For example, the location database may store a user's geographic location provided by the user's GPS-equipped mobile device.

In particular embodiments, the social-networking system 110 may have a presence server that maintains data pertaining to user presence received by mobile devices 120A, 120B and social-networking system 110. In particular embodiments, when users of the social-networking system 110 access the social-networking system, the social-networking system may store data that the user is present in a presence server. In particular embodiments, on or more applications on mobile device interact with the presence server of the social-networking system 110. The presence server may pull presence information for all mobile devices that are accessing the network and logged into the social-networking system. In particular embodiments, the social-networking system 110 may continuously receive asynchronous messages at particular time intervals, such as every 30 s, 1 min, 5 min, and so on from an application executing on the mobile devices. In particular embodiments, the user may specify that they are "online" or at a particular location. In particular embodiments, the user may select preferences for whether their presence information is transmitted to or accessed by the social-networking system 110. In particular embodiments the user may specify additional user information, described above, that may also be transmitted or accessed by the social-networking system 110. In particular embodiments, one or more aspects of the user's presence or privacy settings may be stored locally on the mobile devices 120A, 120B in order to obviate the need for remote access and the settings may be periodically synchronized with the presence server or a privacy controls database in the social-networking system 110. In particular embodiments, the presence application may also retrieve and display the presence information associated with the social network contacts of the user. In addition, information relating to the user's contacts may be stored locally on the user's mobile device.

In particular embodiments of a social-networking system 110, a privacy policy database may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy policy database.

In particular embodiments, the privacy policy database may specify a set of entities that includes exceptions that are not allowed to access the user's information. In particular embodiments, for example, the user of the social-networking system may allow all external systems to access the user's work information but specify a list of external systems that are not allowed to access the work information. In particular embodiments, the list of exceptions that are not allowed to access certain information of the user may be a "block list."

In particular embodiments, external systems belonging to a block list specified by a user of the social-networking system are blocked from accessing the information specified in the privacy setting stored in the privacy policy database. Particular embodiments contemplate various combinations of granularity of permitted access or denial of access depending on the type of user information and sets of entities with which information may be shared or accessed by the sets of entities, as specified by the user and stored in the privacy policy database.

In particular embodiments of a social-networking system 110, an authorization server may enforce the privacy settings of the users of the social-networking system. In particular embodiments, the privacy setting of a user determines how particular information associated with a user may be shared. In particular embodiments, as described above, the privacy policy database comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that may potentially access the information. In particular embodiments, the information that may be shared by a user may comprise any aspect of the user profile, events, locations, media, activities, or the news feed associated with the user.

Mobile devices may include so-called dual mode functionality including radio frequency (RF) and associated functionality allowing for wireless communication using different network protocols and networks. For example, some dual mode mobile devices allow for packet-based, wireless communications over a cellular network using cellular network protocols, and over wireless local area networks using so-called WiFi or IEEE 802.11 standards. The IEEE 802.11 standard supports both an infrastructure mode where wireless communications are coordinated by an access point and an ad hoc mode where wireless communications are coordinated by a designated peer node. Much of the IEEE 802.11 standard defines a common operation whether using ad hoc or infrastructure mode. The use of ad hoc mode only affects the protocols, so there is generally no impact on the Physical Layers (i.e., 802.11a and 802.11b). Within the Media Access Control (MAC) Layer, all of the carrier sensing and most of the frame types and corresponding usage are the same regardless of which mode is utilized.

A mobile ad-hoc network (MANET) tends to be comprised of a small group of mobile devices that are all in very close proximity to each other. Mobile ad hoc networks function as fallback mechanism when normally available infrastructure mode gear, such as access points or routers, stop functioning or are unavailable. Each mobile device within the mobile ad-hoc network is free to move independently in any direction, and therefore will change its links to other mobile devices frequently.

Figure 2:
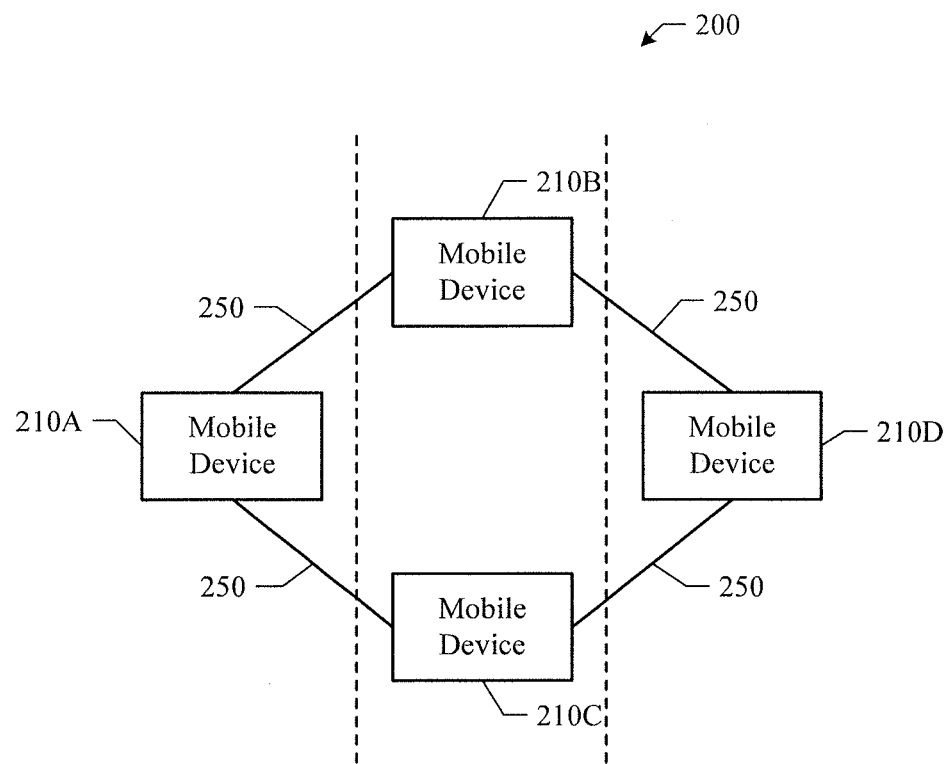
FIG. 2 illustrates an example mobile ad-hoc network system.

FIG. 2 illustrates an example system comprising various structural elements of a mobile or mobile ad-hoc network. Mobile devices 210A, 210B, 210C, 210D may be so-called dual-mode phones. Mobile devices 210A, 210B, 210C, 210D are all in proximity and within a direct radio connectivity to each other and each have radio equipment that enables them to communicate to each other via links 250 using any suitable mobile network protocols or mobile ad hoc network protocols. Mobile devices 210A, 210B, 210C, 210D may also communicate to the social-networking system through the network. Note that only four mobile devices are illustrated in order to simplify the discussion. In practice, there may be tens, hundreds, or even thousands of mobile devices in proximity to each that may be available for friending or group formation.

In particular embodiments, the mobile devices 210A, 210B, 210C, 210D transmit wireless link layer management frames to create, discover, or maintain a mobile ad hoc wireless network. In particular embodiments, mobile devices 210A, 210B, 210C, 210D transmit messages using carrier-grade networks, such as with a cellular-based infrastructure, to manage communications between mobile devices. In particular embodiments, mobile devices 210A, 210B, 210C, 210D may transmit messages using the social-networking system.

Figure 3:
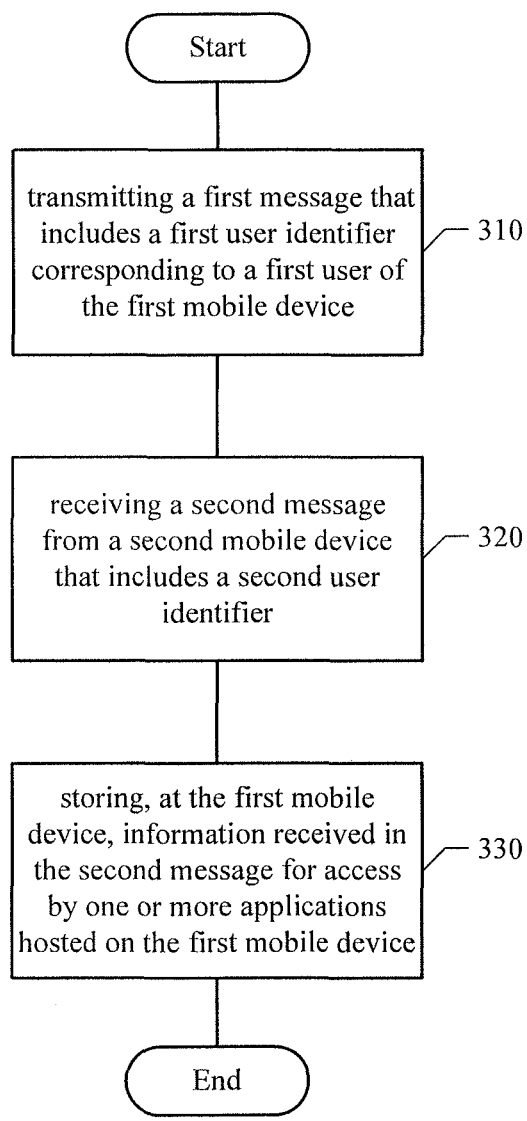
FIG. 3 is a flow chart illustrating an example method of friend discovery.

FIG. 3 illustrates an example method for discovery of users of mobile devices within a direct radio connectivity that are members of a social-networking system. Mobile devices 210A, 210B, 210C, 210D may execute a local discovery mode, causing the mobile device 210A to seek other social network users within the vicinity or discover other social network contacts within local RF range and friend everyone within the vicinity or form a group of all social network users within the vicinity. In particular embodiments, the vicinity may be a particular locale or event, and the like. The locale or event may be set up through the social-networking system in advance or created after the discovery of all of the mobile devices within direct radio connectivity. For example, a user of the social-networking system may be at a night club on a particular evening. The user may interact with the social-networking system through a local mobile device application and check-in at that location or even upload a photo using a photo uploading tool. The user may wish to see if there are other users of the social-networking system around them within direct radio connectivity and friend them.

The application layer supports network access, as well as provides services for user applications. Within the OSI model of application layer, there is a session layer and a presentation layer. The session layer provides the mechanism of opening, closing, and managing a session between end-user application processes, i.e. a semi-permanent dialogue. In the session layer, communication consists of requests and responses that occur between applications. The presentation layer, in contrast, is responsible for the delivery and formatting of information to the application layer for further processing or display. The presentation layer may also compress data and secure transmitted information through the use of encryption.

In particular embodiments, a first mobile device transmits a first message that includes a first user identifier corresponding to a first user of the first mobile device, as illustrated in step 310. In particular embodiments, the mobile devices 210A, 210B, 210C, 210D append information elements, such as a user identifier, that may be recognized by the social-networking system and mobile devices within the vicinity. The first mobile device may either communicate with the social-networking system or transmit a general broadcast to other devices within a direct radio connectivity. The message may be to discover other users of the social-networking system that are in proximity to the first user, to friend all other users within direct radio connectivity, or to create a group of all of the users within radio connectivity around the first user. For example, in a club setting, a first user of a first mobile device may want to know if there are other users around them who are also members of the social-networking system. Or, for example, if the user meets another particular person or groups of people and wants to friend at least one of them, then their device would transmit a first message that includes information corresponding to them.

A user identifier may comprise a userID or other information (e.g., a uniform resource locator, etc.) associated with a user account for a user of a social-networking system. In particular embodiments, the userID and other information associated with the social-networking system may be encrypted. In particular embodiments, for example, the social network information may be encrypted using asymmetric encryption (e.g., Public-Private key encryption). In particular embodiments, for example, each mobile device 210A, 210B, 210C, 210D may obtain an encrypted version of the user identifier corresponding to the respective user, where the encrypted version was encrypted by the social-networking system using a private key of the social-networking system. In this manner, only other users of the social-networking system (who obtain the public key) may decrypt the user identifying information and utilize the user identifier. In particular embodiments, the first mobile device and one or more second devices may be in "promiscuous mode" wherein the mobile devices transmit the public key to other users of the social-networking system so that the other users may be able to view information associated with the user's user account or profile in the social-networking system. In particular embodiments, the user identifying information may be encrypted using a symmetric key algorithm, where the encryption key is a function of the user identifier of the user. A mobile device that receives encrypted user identifying information would apply a key generation function to generate keys for all users in a locally stored list, such as a list of user identifiers in a local contacts database. If the decrypted user identifying information matches a user identifier stored in the local contacts database, a match is declared. In this manner, only social contacts of a given user may resolve the user identifying information with relative ease, as opposed to trying all possible combinations of user identifiers to decrypt the information. In particular embodiments, any users of a social networking system may be able to resolve a particular user's identifying information if the user's settings were such that they allowed for that. For example, in a club setting, the each mobile device 210A, 210B, 210C, 210D device may be set in a "promiscuous mode" where the devices may provide all user and other relevant information to the other mobile devices in the vicinity, or they be set in another mode that is more restrictive of what information is viewable to other users of the social network system.

In particular embodiments, the first mobile device receives a second message from one or more second mobile devices that includes a second user identifier, as illustrated in step 320. In particular embodiments, the second users of the second mobile devices may be members of the social-networking system. In particular embodiments, receiving these messages allows the user of the first mobile device to associate with the IP and/or MAC addresses of the second mobile devices having respective users within the social-networking system. In particular embodiments, the association may depend on the privacy settings of the respective second users. In particular embodiments, the second users of the second mobile devices may or may not be members that reside in the contact list of the first user of the first mobile device.

Figure 5:
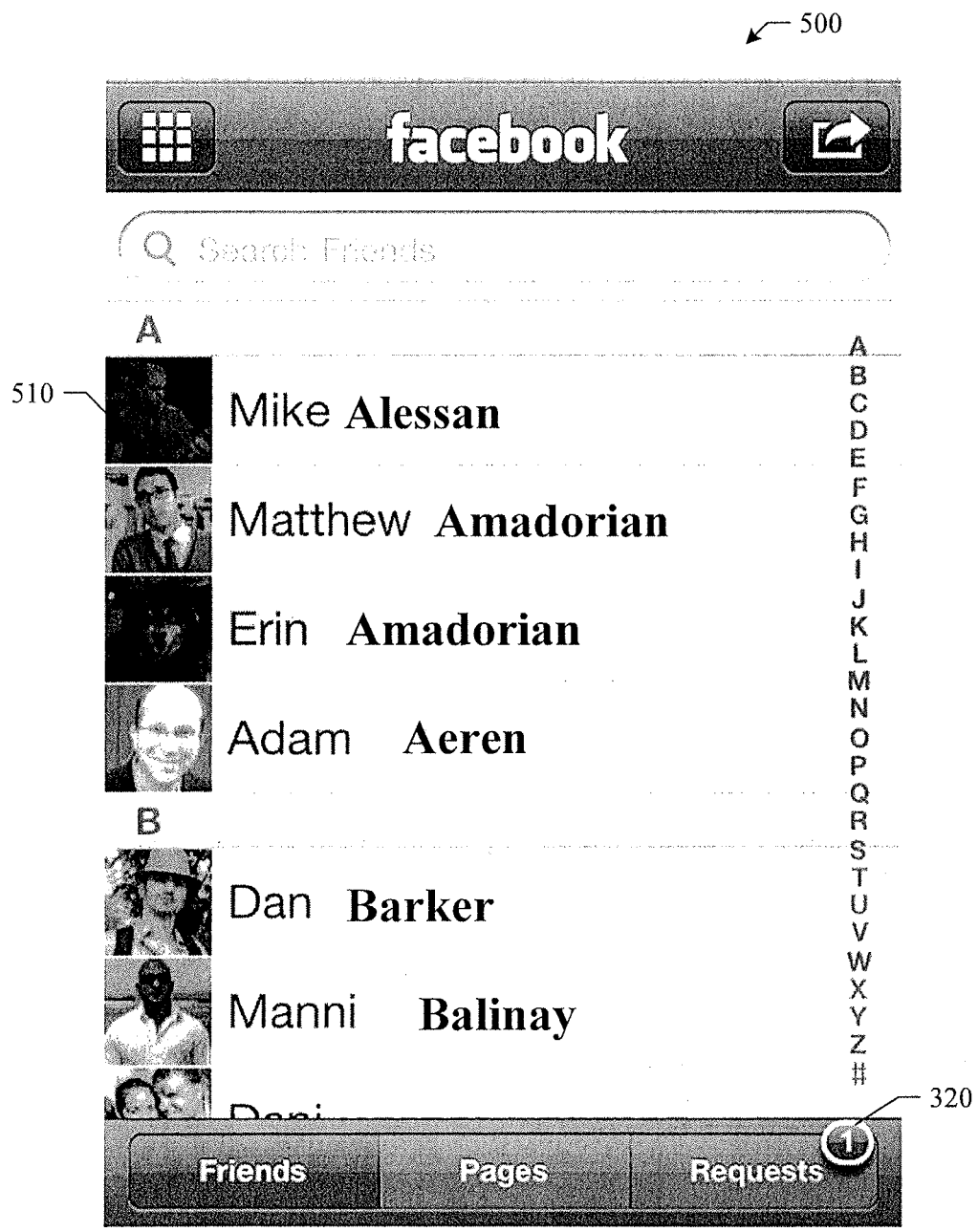
FIG. 5 illustrates an example list of other users who may be available for communication.

Particular embodiments, responsive to receiving the user identifier of a second user, access the stored information to present the first user with a list of a localized group of users of the social-networking system. In particular embodiments, when the application has connectivity over a cellular packet radio network it may access the social-networking system for presence information of the other second users. In particular embodiments, an application hosted on mobile device 210A, for example, may access the user identifier information of the users of one or more second mobile devices 210B, 210C, 210D available through the socially extended networking functions discussed above to present to a user a list of other users that are available for friending. FIG. 5 illustrates an example list 500 of other users 510 who are within a direct radio connectivity of the first mobile device and may be available for friending or group formation within the application hosted on a mobile device. The users listed in the display may or may not be current friends of the user of the first mobile device. The information displayed for each user may depend on each user's privacy settings in the social-networking system.

Once the user list 500 is presented to the first user, the application on the first mobile device may prompt the first user to friend one or more of the second users 510 in the list 500, to form a group comprising the one or more second users 510, or even establish an event. In this manner, the mobile device may communicate with the social-networking system in order to access and present the list 500. In particular embodiments, the first user may automatically friend all of the users 510 in list 500 for all time, or for example, the first user may create a separate friend list restricted by the date and time of the current event. For example, in a club scenario where the first user is presented with a list of all users of the social-networking system that are in direct radio connectivity and the first user opts to friend everyone, the first user may also create a particular group of friends, such as "Club Friday Night," that represents this particular group of people that the first user friended at this particular time. As opposed to friending everyone in the vicinity, the first user may opt to friend only one or a few of the users 510 that are in direct radio connectivity of the first user.

In particular embodiments, extending MANET messages with social network information allows users to discover and communicate with other users within the MANET when, for example, cellular network conditions would not otherwise permit interaction (such as poor or no cellular service, an oversubscribed cell tower and the like). In particular embodiments, a socially-extended MANET may be used to friend other users of the social-networking system, create a group within the social-networking system, and share media files directly with social network contacts within the MANET without having to upload the files to a central system over a cellular packet radio network.

Figure 4:
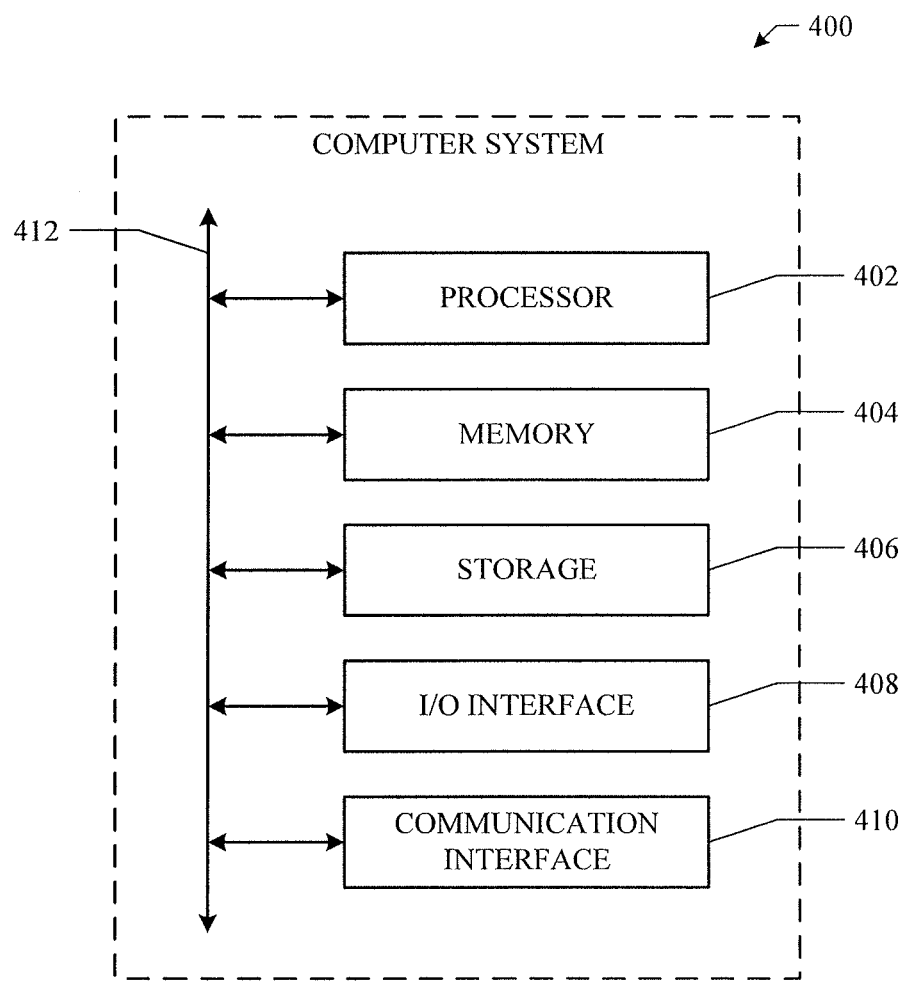
FIG. 4 illustrates an example computer system.

Particular embodiments may be implemented on one or more computer systems. FIG. 4 illustrates an example computer system 400 that may be used to implement a host, such as a server, client desktop computer or mobile device that executes the functionality described above. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by a social networking system, a first message from a mobile device application on a first-user mobile device associated with a first user, the message comprising a first-user identifier corresponding to a first-user account maintained for the first user by the social networking system;
   determining, by the social networking system, a location of the first-user mobile device;
   storing, by the social networking system, privacy data comprising a plurality of user settings for a plurality of users in a privacy policy database, each of the plurality of user settings being associated with a type of user datum associated with a particular user;
   determining, by the social networking system, that a plurality of mobile devices are within a vicinity of the location of the first-user mobile device and within a local RF range for direct connectivity with the first-user mobile device, and that a particular user setting associated with each of the plurality of users of the plurality of mobile devices allows for one or more types of user data associated with a location to be shared with the first user, each of the plurality of mobile devices being associated with a user identifier corresponding to a user account maintained by the social networking system;

transmitting, by the social networking system, a second message to the first-user mobile device, the second message enabling the first user to create a group within the social-networking system;

receiving, by the social-networking system, a request to create the group including the first user and each of a plurality of users being associated with the plurality of mobile devices within the local RF range for direct connectivity with the first-user mobile device; and creating and storing a record of the group in social graph information.

2. The method of claim 1, further comprising transmitting a third message to a selected one of the plurality of mobile devices within the local RF range for direct connectivity with the first-user mobile device, the third message comprises the first-user identifier associated with the first user of the first-user mobile device.

3. The method of claim 2, further comprising:
in response to the first user friending within the social-networking site a second user associated with the selected one of the plurality of mobile devices within the local RF range for direct connectivity with the first user-mobile device, establishing an association between the first user and the second user associated with the selected one of the plurality of mobile devices within the social-networking site.

4. The method of claim 3, further comprising transmitting, to the selected one of the plurality of mobile devices associated with the second user, notification that the second user was friended by the first user.

5. The method of claim 3, wherein establishing the association comprises storing an association between the first-user identifier and a second-user identifier associated with the second user.

6. The method of claim 1, wherein the second message includes an option for generating at least one of a friend request, a message, and a group creation.

7. The method of claim 1, further comprising:
receiving, from the first-user mobile device, a fourth message indicating that the group was generated, the fourth message comprising the first-user identifier.

8. The method of claim 1, wherein the second message is transmitted in response to determining that at least one user identifier being associated with a corresponding one of the plurality of mobile devices within the local RF range for direct connectivity with the first-user mobile device is discoverable within the social networking system.

9. The method of claim 1, wherein the second message is transmitted in response to determining that at least one user identifier being associated with a corresponding one of the plurality of mobile devices within the local RF range for direct connectivity with the first-user mobile device is discoverable within the social networking system.

10. A system for connecting users of a social networking system comprising:
one or more processors associated with the social networking system; and
a memory coupled to the processors comprising instructions executable by the one or more processors, the one or more processors being operable when executing the instructions to:
receive a first message from a mobile device application on a first-user mobile device associated with a first user, the message comprising a first-user identifier corresponding to a first-user account maintained for the first user by the social networking system;
determine a location of the first-user mobile device;
store privacy data comprising a plurality of user settings for a plurality of users in a privacy policy database, each of the plurality of user settings being associated with a type of user datum;
determine that a plurality of mobile devices are within a vicinity of the location of the first-user mobile device and within a local RF range for direct connectivity with the first-user mobile device, and that a particular user setting associated with each of the plurality of users of the plurality of mobile devices allows for one or more types of user data associated with a location to be shared with the first user, each of the plurality of mobile devices being associated with a user identifier corresponding to a user account maintained by the social networking system;
transmit a second message to the first-user mobile device, the second message enabling the first user to create a group within the social-networking system;
receive a request to create the group including the first user and each of a plurality of users being associated with the plurality of mobile devices within the local RF range for direct connectivity with the first-user mobile device; and
create and store a record of the group in social graph information.

11. The system of claim 10, further comprising transmitting a third message to a selected one of the plurality of mobile devices within the local RF range for direct connectivity with the first-user mobile device, the third message comprises the first-user identifier associated with the first user of the first-user mobile device.

12. The system of claim 11, wherein:
in response to the first user friending within the social-networking site a second user associated with the selected one of the plurality of mobile devices within the local RF range for direct connectivity with the first user-mobile device, the one or more processors are further operable to establish an association between the first user and the second user associated with the selected one of the plurality of mobile devices within the social-networking site.

13. The system of claim 12, wherein the one or more processors are further operable to transmit, to the selected one of the plurality of mobile devices associated with the second user, notification that the second user was friended by the first user.

14. The system of claim 12, wherein establishing the association comprises storing an association between the first-user identifier and a second-user identifier associated with the second user.

15. The system of claim 10, wherein the second message includes an option for generating at least one of a friend request, a message, and a group creation.

16. The system of claim 10,
wherein the one or more processors are further operable to:

receive, from the first-user mobile device, a fourth message indicating that the group was generated, the fourth message comprising the first-user identifier.

17. One or more computer-readable non-transitory storage media embodying software that is operable when executed to:
- receive a first message from a mobile device application on a first-user mobile device associated with a first user, the message comprising a first-user identifier corresponding to a first-user account maintained for the first user by the social networking system;
- determine a location of the first-user mobile device;
- store privacy data comprising a plurality of user settings for a plurality of users in a privacy policy database, each of the plurality of user settings being associated with a type of user datum associated with a particular user;
- determine that a plurality of mobile devices are within a vicinity of the location of the first-user mobile device and within a local RF range for direct connectivity with the first-user mobile device, and that a particular user setting associated with each of the plurality of users of the plurality of mobile devices allows for one or more types of user data associated with a location to be shared with the first user, each of the plurality of mobile devices being associated with a user identifier corresponding to a user account maintained by the social networking system;
- transmit a second message to the first-user mobile device, the second message enabling the first user to create a group within the social-networking system;
- receive a request to create the group including the first user and each of a plurality of users being associated with the plurality of mobile devices within the local RF range for direct connectivity with the first-user mobile device; and
- create and store a record of the group in social graph information.

18. The one or more computer-readable non-transitory storage media of claim 17, wherein the second message includes an option for generating at least one of a friend request.

19. The one or more computer-readable non-transitory storage media of claim 17, wherein the software is further operable to be executed to:
- in response to the first user friending within the social-networking site a second user associated with the selected one of the plurality of mobile devices within the local RF range for direct connectivity with the first-user mobile device, establish an association between the first user and the second user associated with the selected one of the plurality of mobile devices within the social-networking site.

20. The one or more computer-readable non-transitory storage media of claim 19, wherein the software is further operable when executed to:
- receive, from the first-user mobile device, a fourth message indicating that the group was generated, the fourth message comprising the first-user identifier.

* * * * *